US008998171B2

(12) United States Patent
Bormioli

(10) Patent No.: US 8,998,171 B2
(45) Date of Patent: Apr. 7, 2015

(54) CONTROL VALVE FOR SEPARABLE CONNECTION UNIT FOR FLEXIBLE PIPES

(75) Inventor: Lorenzo Bormioli, Padua (IT)

(73) Assignee: MIB Italiana S.p.A., Casalserugo PD (IT)

( * ) Notice: Subject to any disclaimer, the term of this patent is extended or adjusted under 35 U.S.C. 154(b) by 125 days.

(21) Appl. No.: 13/992,027

(22) PCT Filed: Oct. 25, 2011

(86) PCT No.: PCT/EP2011/068683
§ 371 (c)(1),
(2), (4) Date: Aug. 16, 2013

(87) PCT Pub. No.: WO2012/076242
PCT Pub. Date: Jun. 14, 2012

(65) Prior Publication Data
US 2013/0319559 A1  Dec. 5, 2013

(30) Foreign Application Priority Data

Dec. 6, 2010 (IT) .............................. MI2010A2248

(51) Int. Cl.
*F16L 37/28* (2006.01)
*F16L 55/10* (2006.01)
*F16K 1/18* (2006.01)
*F16L 23/036* (2006.01)

(52) U.S. Cl.
CPC ............... *F16L 55/1007* (2013.01); *F16K 1/18* (2013.01); *F16L 23/036* (2013.01)

(58) Field of Classification Search
USPC .......... 251/149–149.2, 149.8, 212, 213, 228; 137/68.14–68.16, 614, 614.02–614.06, 137/798–799; 166/321
See application file for complete search history.

(56) References Cited

U.S. PATENT DOCUMENTS

| 1,802,732 | A | * | 4/1931 | Muller | 251/1.3 |
|---|---|---|---|---|---|
| 2,043,337 | A | * | 6/1936 | Smith | 251/149 |
| 2,199,894 | A | * | 5/1940 | Phelps | 406/53 |
| 2,270,433 | A | * | 1/1942 | Goffredo | 251/279 |
| 2,321,336 | A | * | 6/1943 | Tondreau | 251/212 |
| 2,649,272 | A | * | 8/1953 | Barbato | 251/212 |
| 4,326,555 | A | | 4/1982 | Thomson | |

FOREIGN PATENT DOCUMENTS

GB       2 051 993       1/1981
IT    MI 2009A002146     6/2011

\* cited by examiner

*Primary Examiner* — Marina Tietjen
(74) *Attorney, Agent, or Firm* — Jacobson Holman, PLLC

(57) ABSTRACT

A control valve for connection unit for flexible pipes, comprising a plurality of sectors, (slices or petals), rotatable between a complete opening position and a complete closing position is described. The aforesaid plurality of rotatable sectors comprises at least two series of rotating sectors of different shape and dimensions disposed in an alternate way along the circumference of the connection unit. The smaller sectors can be controlled in such a way to close slower than the bigger ones. The shape and dimensions of the rotational sectors are such to consent a partial overlapping of the borders of the adjacent sectors for a better tightness between the sectors themselves.

7 Claims, 13 Drawing Sheets

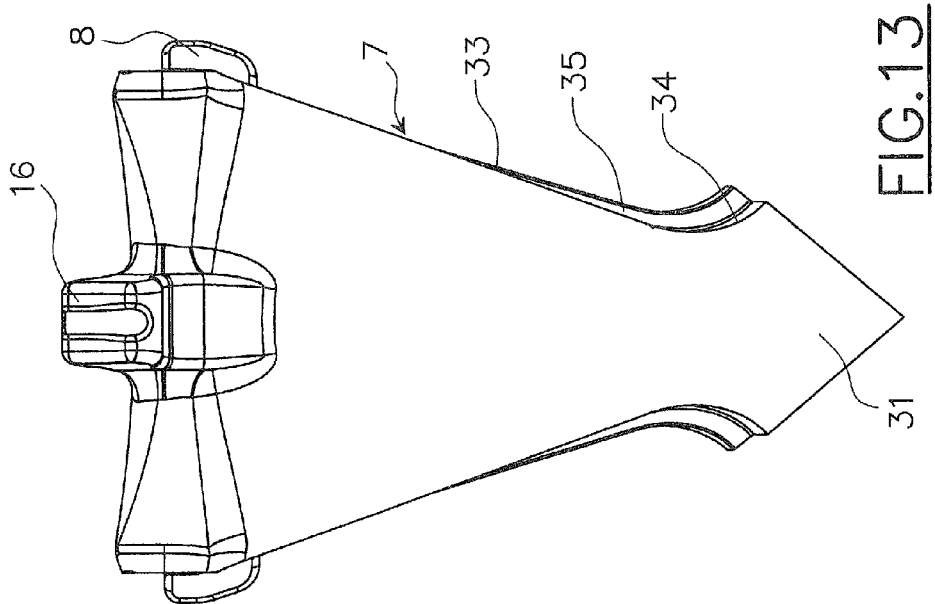
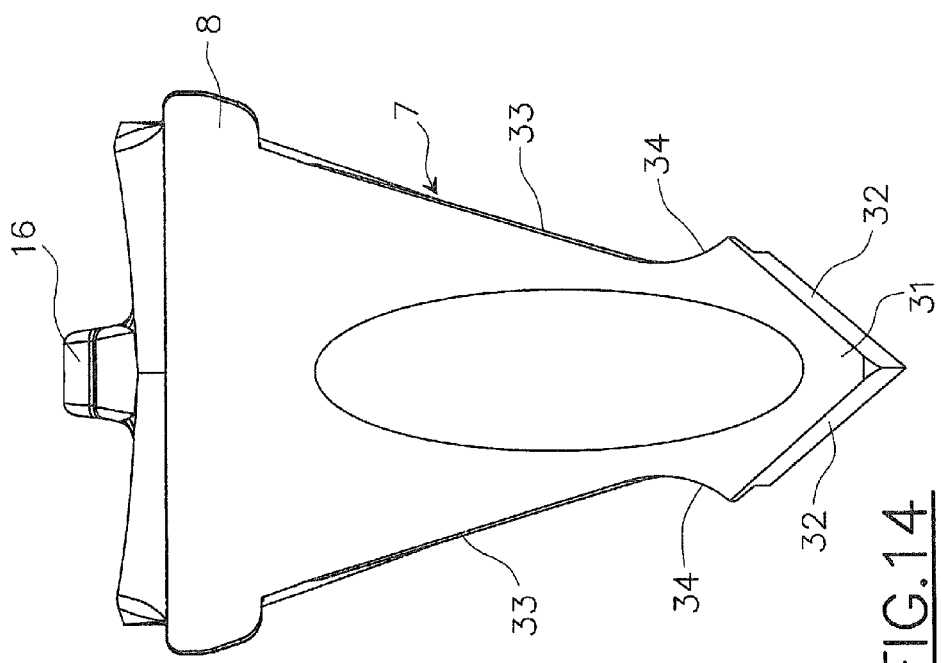

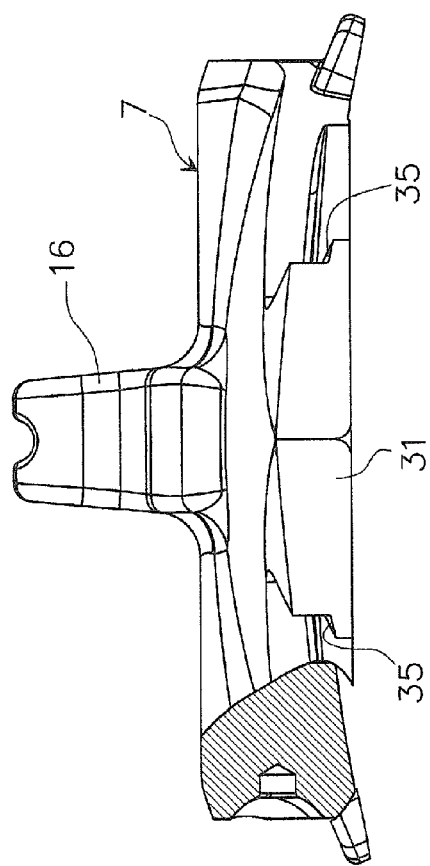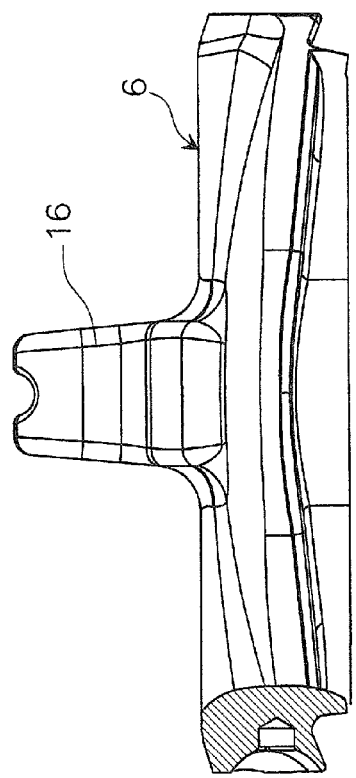

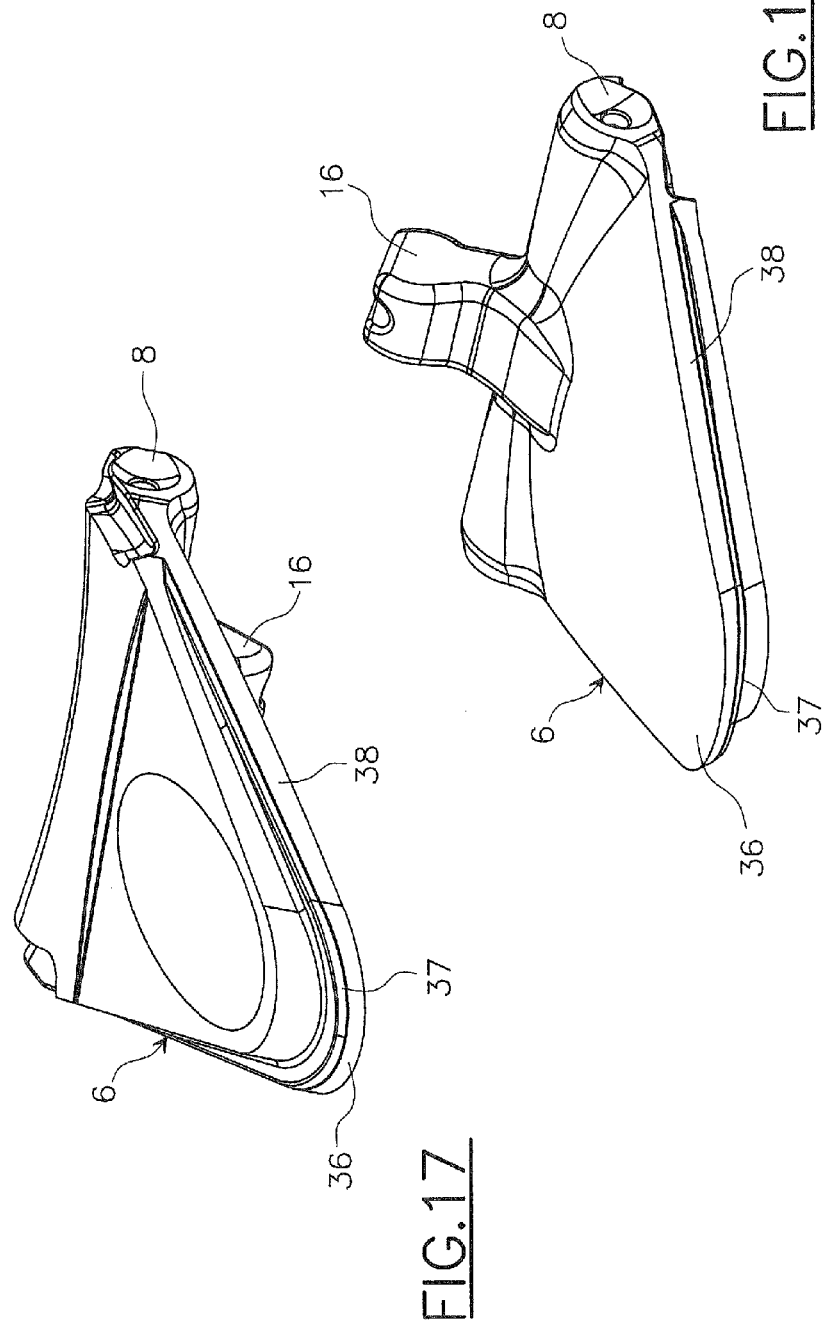

CONTROL VALVE FOR SEPARABLE CONNECTION UNIT FOR FLEXIBLE PIPES

This is a national stage of PCT/EP11/068683 filed Oct. 25, 2011 and published in English, which has a priority of Italian no. MI2010A002248 filed Dec. 6, 2010, hereby incorporated by reference.

* * *

The present invention relates to a petal type control valve for separable connection units for transfer tubes of fluid products, in particular for petroleum products.

The sea transfer of petroleum products from petrochemical installation, from platform, from tanker to tanker, from tanker to land installation and vice versa notoriously occurs by means of flexible tubes and connection units of the tubes themselves which consist of two separable parts, each provided with a respective control valve which automatically closes upon separation to limit the spillage of product into the sea, with consequent less pollution of the same. These connection units are positioned on the part of the flexible tube positioned in the sea and have the primary objective of protecting the tube, and, more in general, the connection line, in case of anomalous situations which cause excessive pulling on the tube or excessive pressure on the line. Such anomalous situations may be: tanker, or, more in general, petroleum installation (FPSO) which breaks away and drifts off, rough sea causing traction on the tube beyond the limits, boat knocking into the tube dragging it away and creating excessive loads on the same, rapid closing of the downstream flow valve or any other reason causing excessive axial load and/or pressure increase.

The control units currently available are made so that the control valves are closed after the separation of the two parts of the connection unit automatically, i.e. without control by an operator in the aforesaid situations.

Fluid control valves of the petal type are also known, i.e. formed by a plurality of slices or petals, which are made to turn between an opening position, in which the petals are substantially parallel to the direction of flow of the petroleum product, and a closing position, in which the petals converge transversally to the axis of the unit to almost completely block the flow of product. The movement from the opening position to the closing position occurs under the bias of elastic means when the withholding action exerted, for example, by an inner axially removable sleeve, ceases following the axial traction stress impressed to the connection unit. Fluid dynamic brakes appropriately slow down the closing speed of the upstream valve to avoid excessive pressure, called water hammer, determined by the combined action of the elastic means and of the pressurized fluid, which may have destructive effects on the control valve and on the connection unit itself.

It is the object of the present invention to make a control valve of the petal or more in general rotational sectors type which is particularly suited to avoiding the formation of water hammer during closing when used as control valve upstream of the separable connection unit for flexible tubes.

In accordance with the invention such an object is reached by a control valve for connection unit for flexible pipes, comprising a plurality of sectors (slices or petals) rotatable between a complete opening position and a complete closing position, characterized in that said plurality of rotatable sectors comprises at least two series of rotating sectors of different shape and dimensions arranged in an alternate way along the circumference of the connection unit.

When the control valve according to the invention is used as upstream control valve in the direction of flow of the fluid, the smaller sectors are preferably driven in such a way to close more slowly with respect to the bigger ones so as to further limit the possibility of forming a water hammer.

The rotatable adjacent sectors have a shape and dimensions such as to consent a partial overlapping of the adjacent sectors for a better tightness between the sectors themselves.

In this manner, it is possible, by appropriately adjusting the fluid dynamic brakes, to avoid the water hammer during the step of closing and the respective harmful effects for installation.

The features of the present invention will be further explained in the following detailed description of a practical embodiment thereof shown by way of non-limitative example in the accompanying drawings, in which:

FIGS. 13 and 14 show reciprocally opposite plan views of the aforesaid bigger rotational sector;

FIG. 15 shows a partially section front view of the aforesaid bigger rotational sector;

FIGS. 16 and 17 shows reciprocally opposite perspective views of an example of smaller rotational sector;

FIG. 20 shows a partially section front view of the aforesaid smaller rotational sector;

FIG. 1 shows a connection unit for flexible tubes, which comprises two separable valve parts or bodies 1 and 2, respectively, upstream and downstream in the direction of flow of the transported fluid product.

The two parts 1 and 2 are connected by burst screws 3, which in case of strong traction stress (equal to or higher than the setting load) break making it possible to separate the two parts.

A cylindrical sliding sleeve 4 (FIG. 1), which is automatically and axially removable from the connection unit when the two parts of the unit are separated, is arranged in the connection unit.

Figure 4:
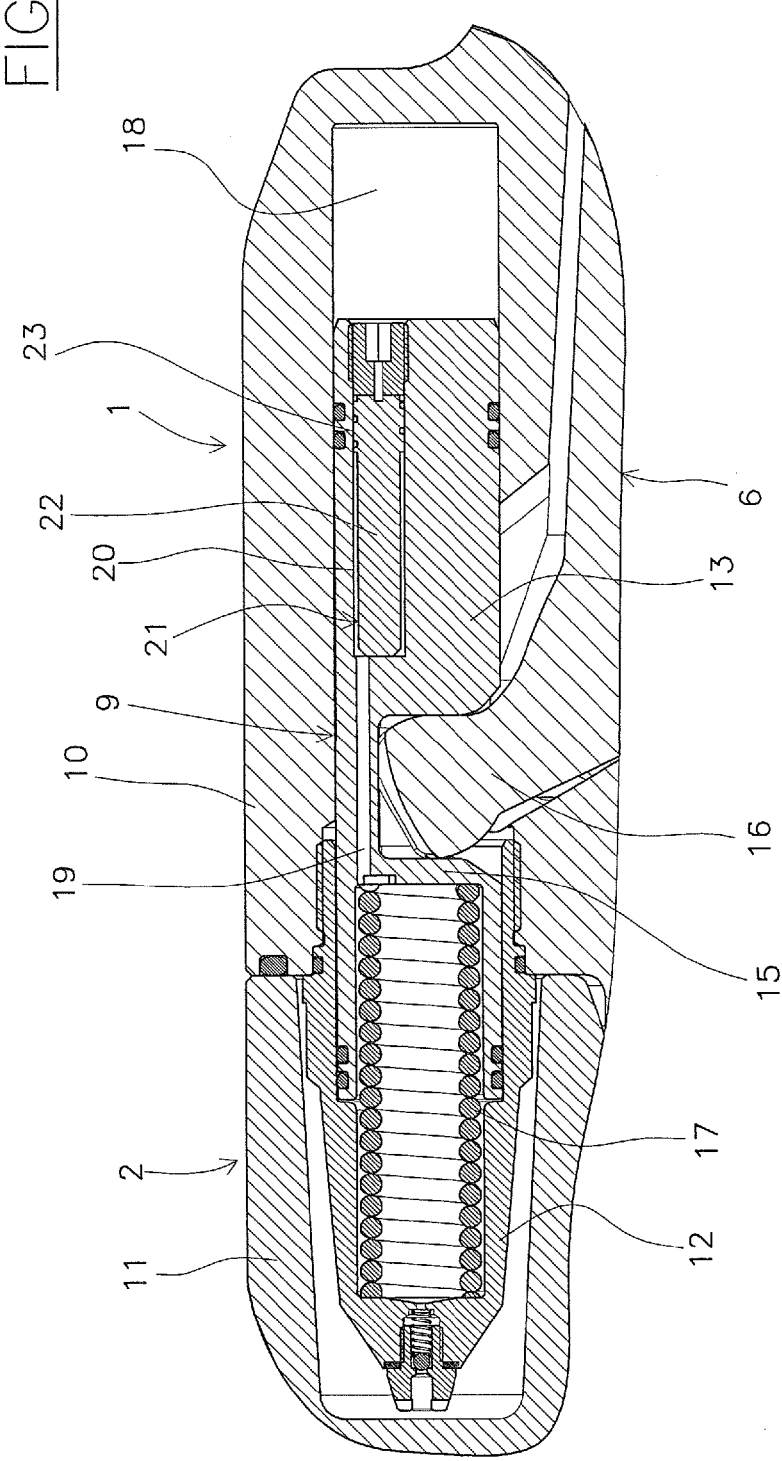
FIG. 4 shows an enlarged detail, sectioned as shown in FIG. 1, of a device according to the present invention, used for closing a rotational sector of the control valve upstream of the connection unit in FIG. 1.
Figure 5:
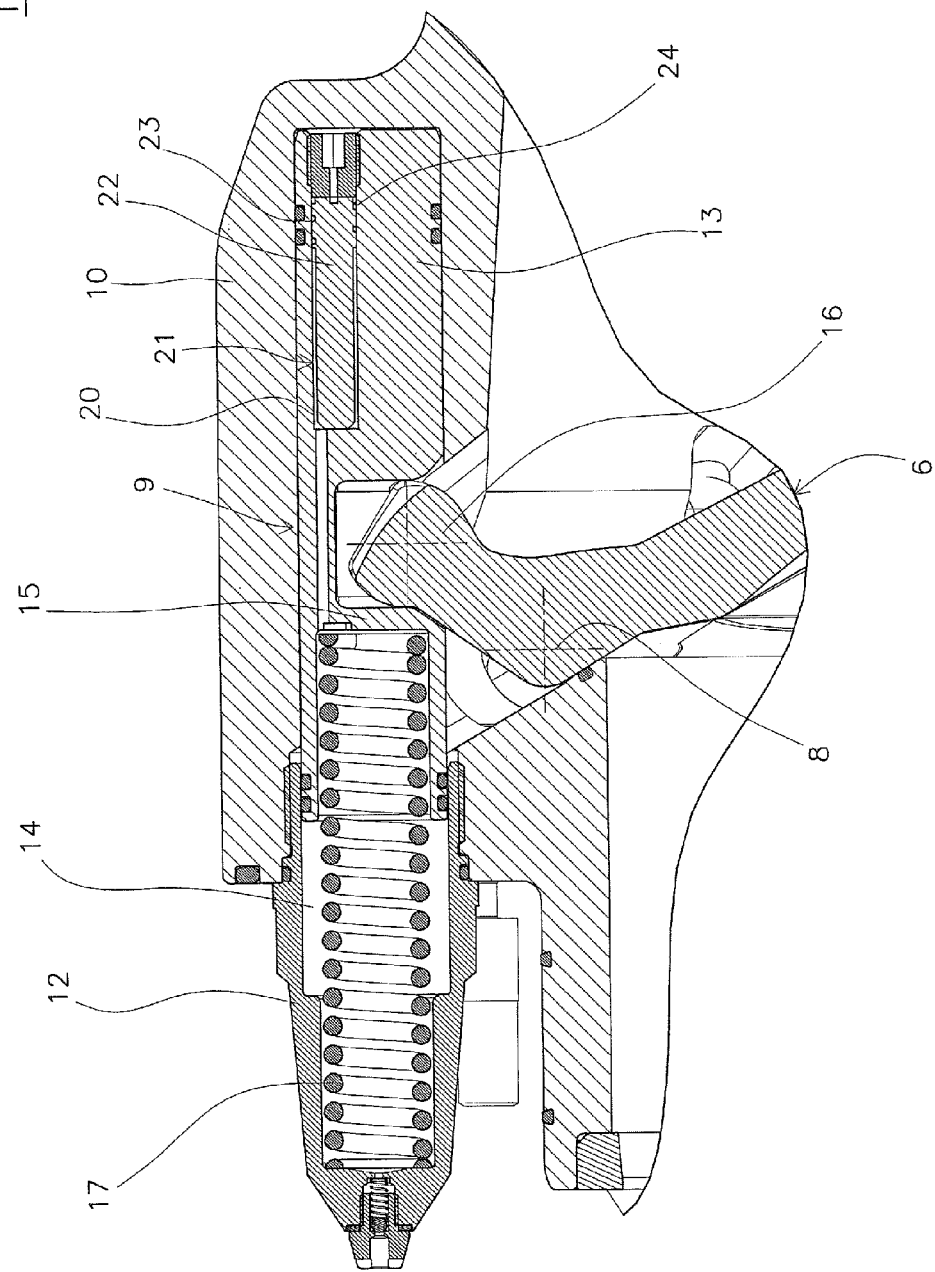
FIG. 5 shows the same device during the step of closing of the aforesaid rotational sector.
Figure 6:
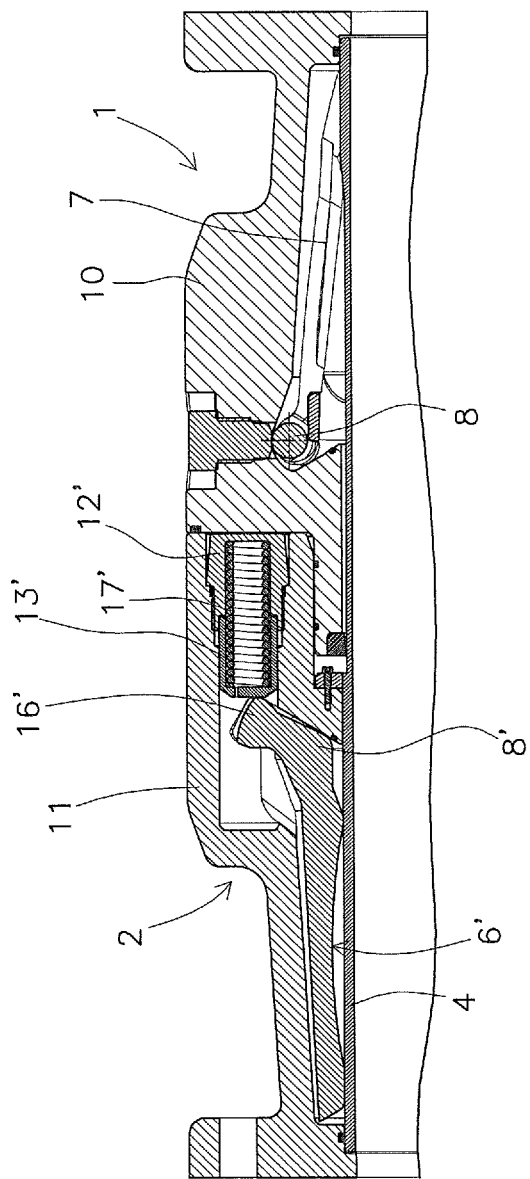
FIG. 6 shows an enlarged detail, sectioned in axial direction, of a device used for closing a rotational sector of the control valve downstream of the connection unit in FIG. 1.
Figure 7:
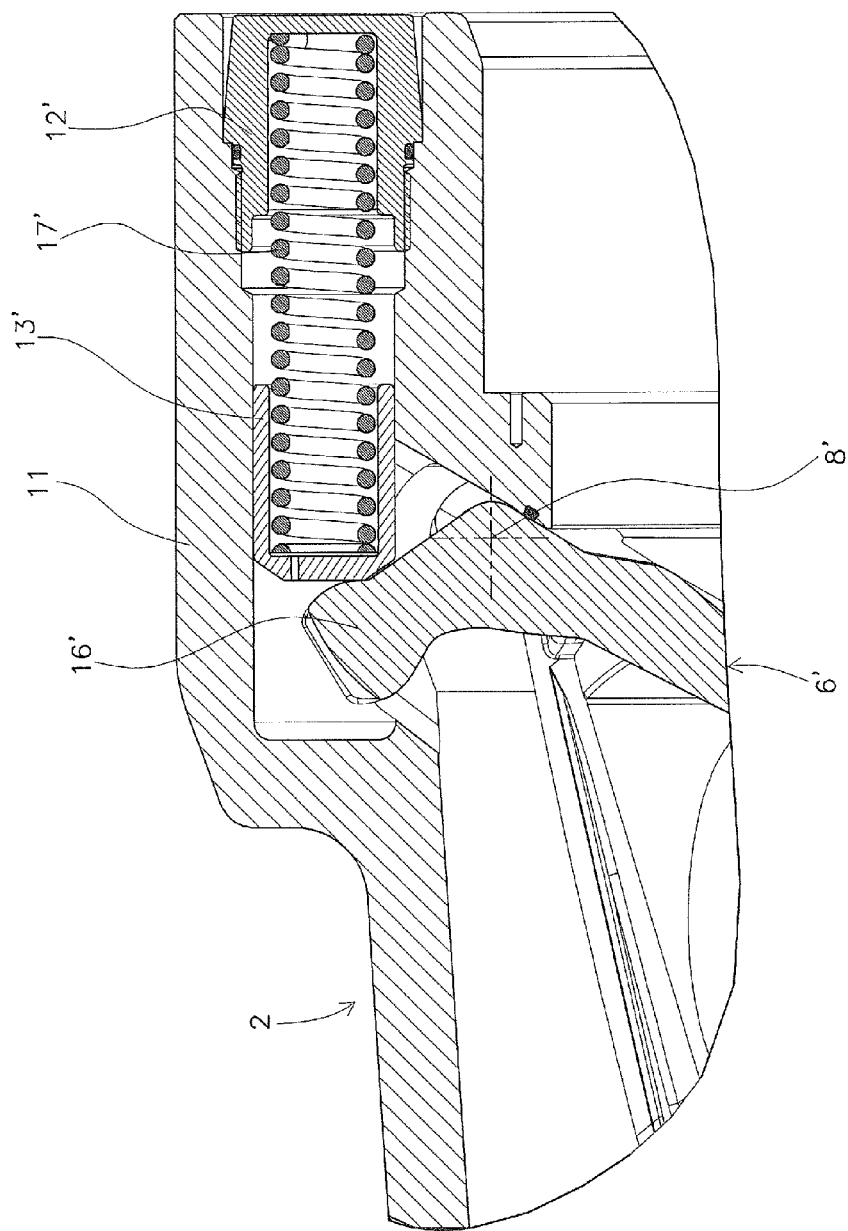
FIG. 7 shows the device in FIG. 6 during the step of closing of the aforesaid rotational sector.

The cylindrical sleeve 4 normally maintains two rotational sector valves 5-5' in the opening position, each of which consists of two series of petals or slices 6-7 and 6'-7' of different shape and different dimensions, which alternate along the circumference about respective axes 8-8' between the opening position of the FIGS. 1-4 and 6 and the closing position in FIGS. 5 and 7.

The functions and operative modes of the sleeve 4 are, for example, described in Italian patent application MI2009A002146 filed on Dec. 4, 2009 by the Applicant.

Taking for example control valve 5, FIGS. 11-21 show in detail the shape and functionality of their petals 6 and 7.

A bigger petal 7 is shown in FIGS. 11-15, where it is seen provided with a V-shaped end 31, the sides 32 of which are intended to abut in a fluid tight manner against the corresponding sides of other neighboring petals 7. Each petal 7 further has lateral sides 33 with an arched extremity 34, which provide a step 35 on which leans, with valve 5 closed, a side of the petal 6 of smaller dimensions interposed between two petals 7 of bigger dimensions.

A petal 6 of smaller dimensions is shown, in turn, in FIGS. 16-20, where it is seen provided with a rounded extremity 36 with step 37, that with valve 5 closed engages tight with the arched extremities 34 of two adjacent petals 7, and straight sides 38 on which the step 37 continues, that with valve 5 closed engage tight with lateral sides 33 of the two adjacent petals 7.

Figure 21:
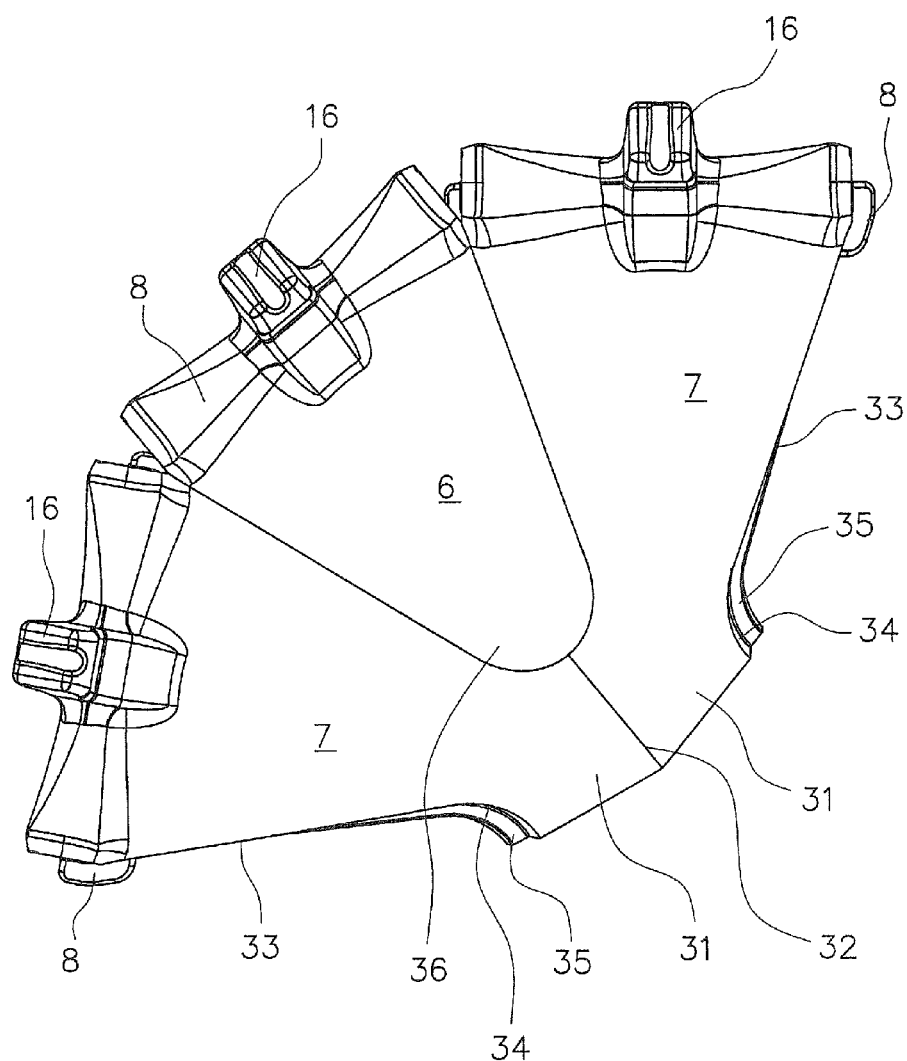
FIG. 21 shows adjacent rotational segments in closing position.

The closing configuration of two petals 7 with intermediate petal 6 is shown in FIG. 21.

Figure 1:
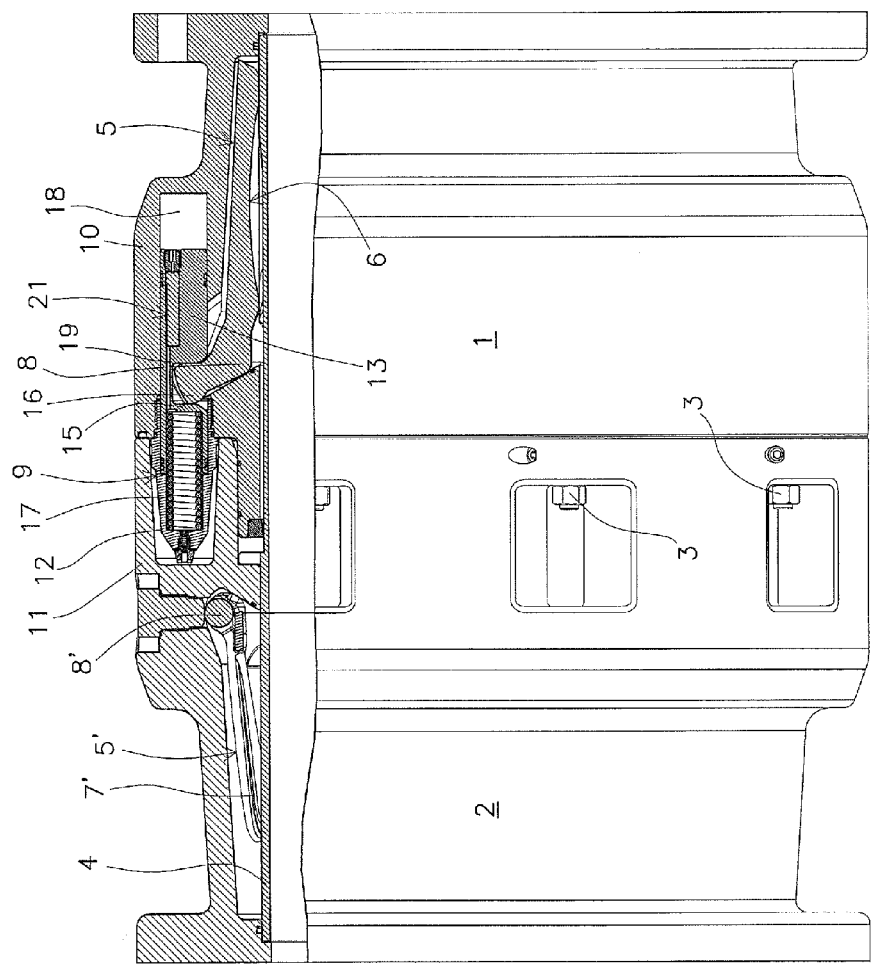
FIG. 1 shows the whole, partially sectioned in axial direction, of a connection unit for flexible tubes which includes two control valves according to the present invention.
Figure 2:
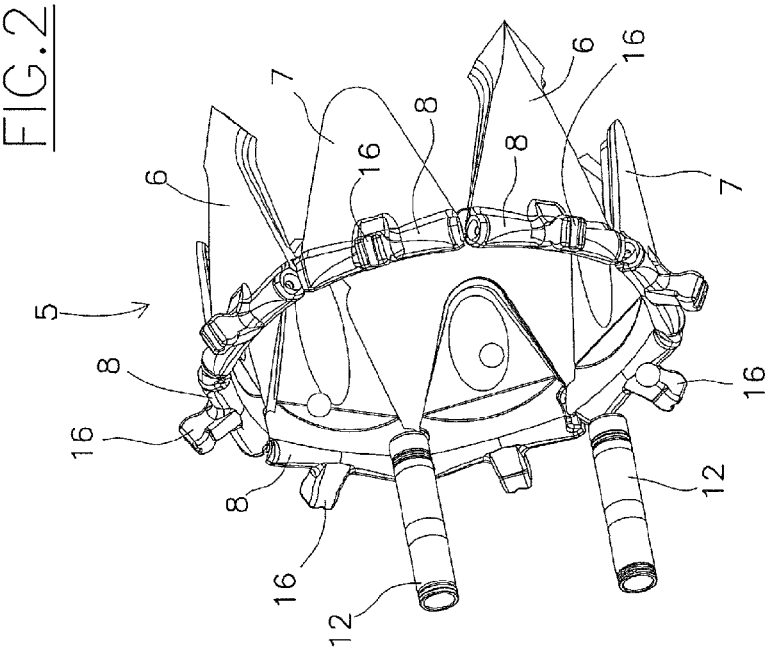
FIG. 2 shows a perspective exploded view of the control valve upstream of the connection unit in FIG. 1.
Figure 3:
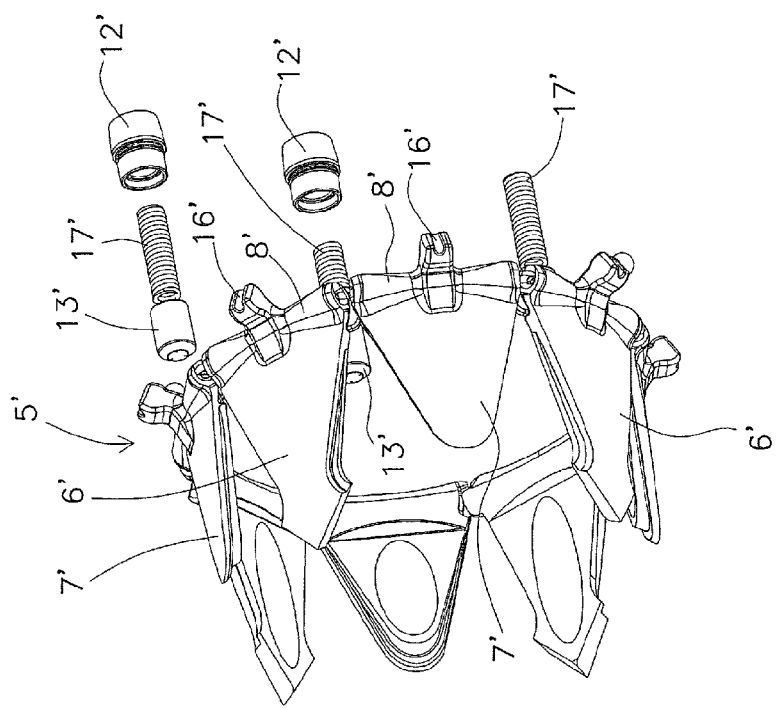
FIG. 3 shows a perspective exploded view of the control valve downstream of the connection unit in FIG. 1.

For the movement thereof from the opening position to the closing position each rotational sector 6-7 of the control valve 5 located upstream in the direction of flow of the fluid product is rotational about the axis 8 thereof under the control of a respective automatically closing device, indicated by reference numeral 9 as a whole in FIGS. 1, 4 and 5. Each device 9 comprises within a containment body 10-11, a fixed body 12 and a mobile body 13 axially sliding with respect to the fixed body 12 (FIGS. 4 and 5). A first chamber 14 is defined inside the fixed body 12 which extends within a first part of the mobile body 13 to the transversal wall 15, which abuts against a control heel 16 of a respective rotational sector 6-7 of the control valve. A helical spring 17 is housed within the first chamber 14, which can extend from the compressed configuration in FIG. 4 to the elongated condition in FIG. 5. The elongation of the spring 17 occurs automatically when the sleeve 4, according to the methods explained in Italian patent application MI2009A002146, is removed axially from inside the valve 5 ceasing the withholding action thereof on the rotational sectors 6 and 7 of the valve itself.

Figure 8:
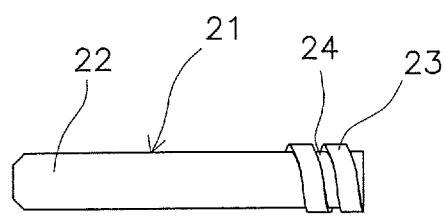
FIGS. 8-10 show possible embodiments of the regulation cartridge of the closing speed of the rotational sectors of the upstream control valve.
Figure 9:
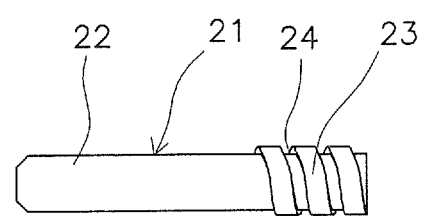
Figure 10:
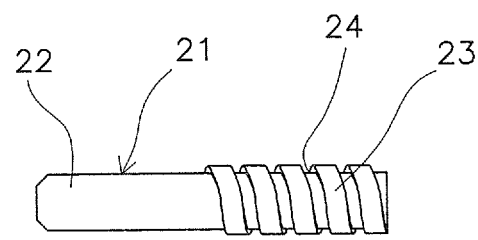
Figure 12:
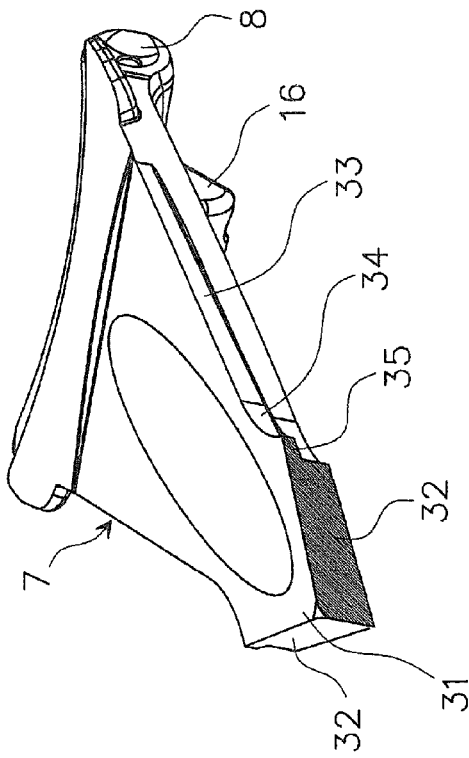
FIGS. 11 and 12 show reciprocally opposite perspective views of an example of bigger rotational sector.
Figure 11:
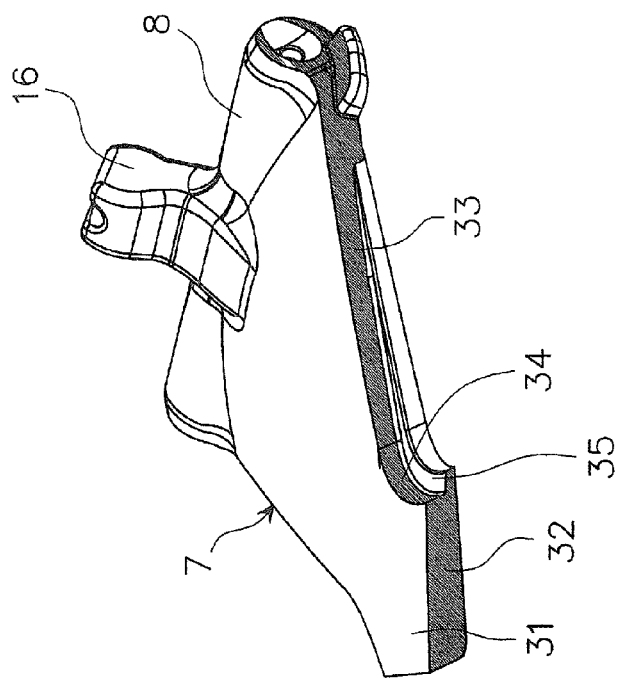
Figure 19:
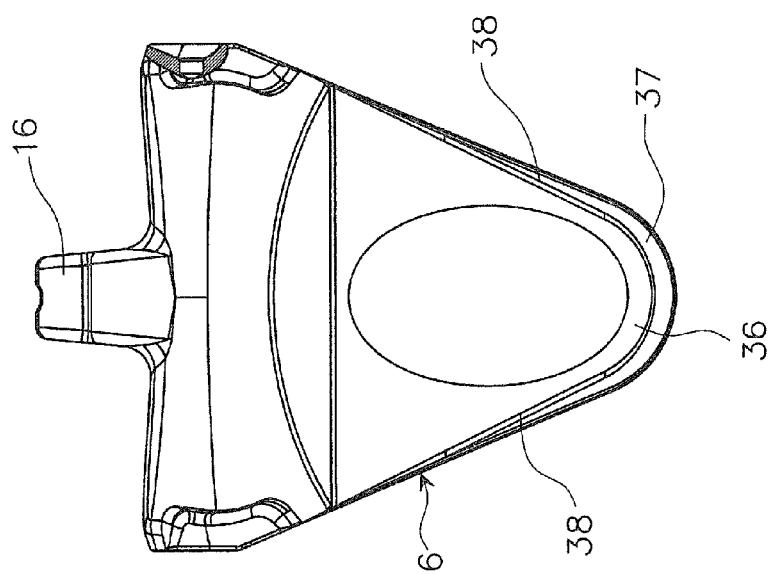
FIGS. 18 and 19 show reciprocally opposite plan views of the aforesaid smaller sector.
Figure 18:
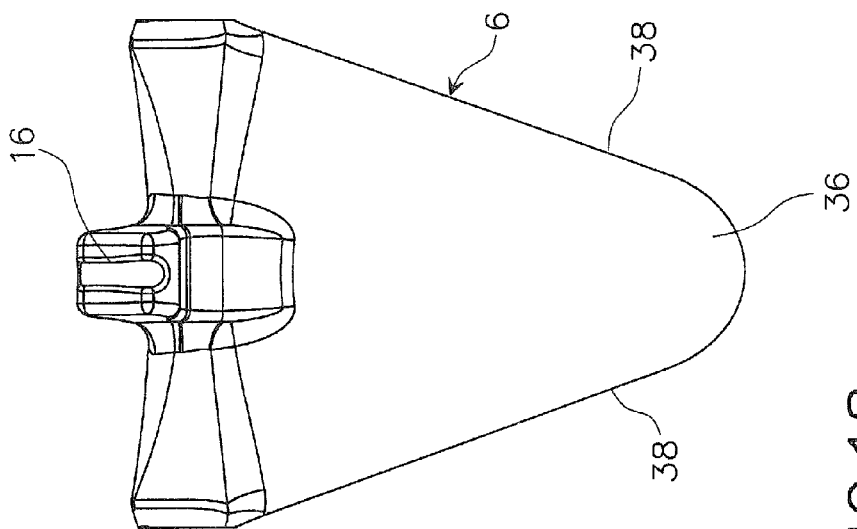

A second chamber 18 is defined on the opposite end of the sliding body 13 in which braking fluid, of approximately chosen viscosity, is normally accommodated. The two chambers 14 and 18 communicate by means of a passage duct 19, which has an widened inlet part 20 in which a flow speed regulation cartridge 21 is inserted, which has a cylindrical part 22 on an inlet side 23 provided with a helical external groove 24. Examples of cartridges 21 with different extensions of the external grooves 24 are shown in FIG. 8-10.

The described communication between the chambers 14 and 18 has the effect of causing the leakage of braking fluid from chamber 18 to chamber 14 during the movement of the sliding body 13 from the position in FIG. 4 to that in FIG. 5, caused by the thrust of the spring 17 in absence of the sleeve 4 and, during the closing rotation of the valve sectors 6-7, by the pressurized fluid which flows through the union part 1. The passage of braking fluid slows down the closing speed of the valve avoiding abrupt impacts which could damage the rotational sectors of the valve itself. Sudden increases of pressure, known as water hammers, are thus avoided.

The passage speed, and thus the closing speed of the single rotation petals, depends on the section of the passage duct 19, the diameter of the cylinder part 22 of the cartridges 21 and the extension of the helical external grooves 24 of the cartridges 21 and may be modified by replacing the cartridges with others of different diameter and with different grooves.

Thus, it is possible to envisage the use of cartridges of one type for rotational sectors 6 of smaller dimensions and of another type for rotational sectors 7 of bigger dimensions, so as to determine different rotation speeds and thus closing speeds of the single petals of the valve 5. More specifically, it is possible to fix a faster closing speed for the petals 7 of bigger dimensions and a slower closing speed for petals 6 of smaller dimensions, which consequently overlap and partially lean on the edges of the adjacent petals 7, thus obtaining the closing configuration in FIG. 21. This allows to obtain a closure which limits the exit of product to the maximum during the closing of the rotation sectors or petals of the control valve, thus limiting the pressure peak generated by the water hammer to acceptable levels.

The rotational sectors or petals 6'-7' of the control valve 5' downstream of the direction of flow of the fluids are, in turn, provided with automatic closing devices 9', shown in FIGS. 1, 6 and 7, which similarly have fixed bodies 12', sliding bodies 13' and normally compressed springs 17' which through the heels 16' determine the rotation, and thus the automatic closure, of the various rotational sectors 6-7 of the valve 5' in case of removal of the sleeve 4. A braking effect similar to that determined by the passage of braking fluid from chamber 18 to chamber 14 is missing instead. The braking effect is indeed determined by the pressurized fluid present in the union part 2.

The invention claimed is:

1. A control valve for connection unit for flexible pipes, comprising a plurality of sectors rotatable between a completely open position and a completely closed position, wherein said plurality of sectors comprises at least two series of sectors of different shape and dimensions disposed in an alternate way along the circumference of the connection unit; wherein the at least two series of sectors includes a series of sector of a larger size relative to the other series of sectors and series of sectors of a smaller size a relative to the other series of sectors, wherein each sector of the series of sectors of the larger size have a V-shaped extremity whose sides, when in the completely closed position, abut in a fluid tight fit manner against corresponding sides of adjacent sectors of the same series, and have lateral sides with an arched extremity that, when in the completely closed position, is leaned on by an adjacent side of a sector from the series of sectors of the smaller size that is interposed between two sectors from the series of the sectors of the larger size, and wherein each sector of the series of sectors of the smaller size have a rounded extremity that, when in the completely closed position, engages tightly with the arched extremities of two adjacent sectors from the series of sectors of the larger size, and have straight sides that, in the completely closed position, engage tight with lateral sides of the two adjacent sectors from the series of sectors of the larger size.

2. The control valve according to claim 1, wherein the valve is an upstream control valve of the connection unit in the direction of flow of the fluid, and the sectors from the series of the smaller size are driven to close slowly with respect to the sectors from the series of the larger size.

3. The control valve according to claim 1, wherein said arched extremity, said rounded extremity, and said straight sides have a step so as to consent a partial overlapping of borders of the adjacent sectors for increasing tightness between the sectors thereof.

4. A control valve for connection unit of flexible pipes, comprising a plurality of petal sectors rotatable between a completely open position and a completely closed position, wherein said plurality of petal sectors comprises at least two series of sectors of different shape and dimensions disposed in an alternate way along a circumference of the connection unit; wherein the at least two series of sectors includes a series of sectors of a larger size relative to the other series of sectors and a series of sectors of a smaller size relative to the other series of sectors, wherein the sectors of the control valve have substantially triangular shapes of different size with bases rotatable about respective pivoting axes arranged as sides of polygonal figure perpendicular to a longitudinal axis of the connection unit.

5. The control valve according to claim 4, wherein the valve is an upstream control valve of the connection unit in the direction of flow of the fluid, and the sectors from the series of the smaller size are driven to close slowly with respect to the sectors from the series of the larger sizes.

6. The control valve according to claim 4, wherein the sectors of bigger dimensions have a V-shaped extremity, whose sides, when in the completely closed positions, abut in a fluid tight fit manner against corresponding sides of adjacent sectors of the same series and have lateral sides with an arched extremity that, when in the completely closed position, is leaned on by an adjacent side of a sector from the series of sectors of the smaller size that is interposed between two sectors from the series of sectors of the larger size, and wherein each sector of the series of the smaller size have a rounded extremity and straight sides that, when in the completely closed position, engage tight with lateral sides of the two adjacent sectors from the series of sectors of the larger sizes.

7. The control valve according to claim 6, wherein said arched extremity, said rounded extremity, and said straight sides have a step so as to consent a partial overlapping of borders of the adjacent sectors for increasing tightness between the sectors thereof.

* * * * *